United States Patent [19]

Markow et al.

[11] Patent Number: 4,582,108

[45] Date of Patent: Apr. 15, 1986

[54] TIRE INFLATION/DEFLATION SYSTEM

[75] Inventors: Edward G. Markow, Oakdale; Jerome Kirsch, Dix Hills; M. Alan Kopsco, Wantagh, all of N.Y.

[73] Assignee: Grumman Aerospace Corporation, Bethpage, N.Y.

[21] Appl. No.: 634,420

[22] Filed: Jul. 26, 1984

[51] Int. Cl.$^4$ .............................................. B60C 23/10
[52] U.S. Cl. ................................. 152/418; 137/224; 137/351; 137/355; 251/129.04; 141/38
[58] Field of Search ............. 152/415, 416, 417, 418; 116/34 R, 34 A, 34 B; 137/224, 355, 351, 236; 251/131, 289; 141/38

[56] References Cited

U.S. PATENT DOCUMENTS

| | | | |
|---|---|---|---|
| 1,127,079 | 2/1915 | Nielson | 152/415 |
| 1,338,337 | 4/1920 | Stonestreet | 152/418 |
| 1,827,662 | 10/1931 | Maas | 152/416 |
| 2,211,935 | 8/1940 | Parker | 152/419 |
| 2,579,048 | 12/1951 | Paul | 152/416 |
| 2,786,333 | 3/1957 | Makara | 152/415 |
| 3,483,053 | 12/1969 | Miserentino et al. | 141/38 |
| 3,511,294 | 5/1970 | Bepristis et al. | 152/418 |
| 3,833,041 | 9/1974 | Glad et al. | 152/415 |
| 4,313,483 | 2/1982 | Brockmann | 152/416 |
| 4,340,077 | 7/1982 | Schiffer et al. | 251/131 |
| 4,421,151 | 12/1983 | Stumpe | 137/224 |
| 4,470,506 | 9/1984 | Goodell et al. | 152/416 |

FOREIGN PATENT DOCUMENTS

| | | | |
|---|---|---|---|
| 55-69375 | 5/1980 | Japan | 251/131 |
| 197807 | 7/1978 | Switzerland | 251/131 |
| 2047638 | 12/1980 | United Kingdom | 152/415 |

*Primary Examiner*—Lois E. Boland
*Attorney, Agent, or Firm*—Richard G. Geib

[57] ABSTRACT

An automatic tire inflation-pressure regulating system for wheeled vehicles with pneumatic tires. The system has a system control assembly in the vehicle operator's compartment, control signal transmitter assemblies on the vehicle body in close proximity with each vehicle road wheel, and a tire pressure-regulating wheel assembly on each wheel. The transmitter assemblies convert electrical command signals initiated by the control assembly to RF signals that are received by an electronic module in each wheel assembly. Means in each wheel assembly selectively deflate or inflate their respective tires in response to the RF control signals. Gas under pressure for inflating the tires is provided either by a plurality of gas generators or by a pressurized gas-generating liquid.

9 Claims, 9 Drawing Figures

TIRE INFLATION/DEFLATION SYSTEM

BACKGROUND OF THE INVENTION

1. Field Of The Invention

This invention relates to automatic pneumatic tire inflation and deflation systems and, more particularly, to a system of that type having remotely controlled inflation and deflation means fitted on the wheel upon which the tire is mounted.

2. Background Of The Invention

In vehicles equipped with pneumatic tires, the potential for significantly improving the mobility of the vehicle by deflating the tires to increase the "footprint" of the tire is well established. For military vehicles, in particular, survivability and mobility could be enhanced during emergency situations by the provision of quick tire deflation for soft terrain mobility and rapid reinflation for resumed roadway travel. In addition, a system for accomodating slow leaks that would maintain the tires at their optimum pressure would result in further benefits in improved vehicle performance and extended tire life. The availability of a full spectrum of tire inflation pressure settings not only would optimize weak soil performance but also rough road dynamic attenuation.

2. Description Of The Prior Art

Automatic pressure control systems for pneumatic tires comprising pressure generating means mounted on the body of the vehicle for providing air under pressure through conduits to the vehicle wheels for inflating the tires are disclosed in the prior art by E. F. Maas, W. R. Paul, and H. Brockmann in U.S. Pat. Nos. 1,827,662; 2,579,048; and 4,313,483 respectively. Unlike the subject system in which the pressure generating means are "add-on" elements which can be readily fastened directly on the wheels of the vehicle, the aforementioned prior art systems would require that they be designed into the vehicle. Further, those systems necessarily require air-supply connections to rotating members for the delivery of air under pressure to the wheels and tires. Leakproof connections to rotating members, particularly under the service conditions to which motor vehicles are routinely subjected, introduce complexity and problems with reliability that militate against the value of those systems.

The prior art also teaches wheel-mounted tire inflation systems as evidenced by U.S. Pat. Nos. 1,127,079; 1,338,337; 2,211,935; and 3,511,294, F. Nielsen, A. W. Stonestreet, C. W. Parker, and A. J. Bepristis et al. respectively. Both F. Nielsen and C. W. Parker teach wheel mounted air pumps having their output connected into the tire. Nielsen and Parker teach pump mechanisms having an arrangement of drive eccentrics and weights which operate when the wheel on which they are fitted rotates such that air under pressure to their associated tire is furnished thereby. However, not only are the pump mechanisms bulky and mechanically complicated, but they will be prone to unacceptable levels of noise ad vibration. Although Stonestreet terms his invention a pneumatic tire inflating mechanism and provides an annular reservoir which is maintained at the normal operating pressure of the tire, the mechanism disclosed operates to relieve back to the reservoir overpressure in the tire resulting from impacting an obstacle. Stonestreet thus teaches a shock absorbing mechanism, not a tire inflating system per se. In the emergency tire inflation system of A. J. Bepristis et al., an annular reservoir of air or chemical reagents under pressure is carried in the "well" of the wheel rim for providing pressurized air or foam as required for inflating a tire mounted on the wheel. Unlike the subject invention which can be fitted without modification on existing vehicle wheels, a wheel having a locking ring on one side of its rim has to be provided to use the system of Bepristis et al.. Bepristis et al. thus do not provide a simple add-on system that can be used to retrofit existing vehicle wheels to give them an automatic inflation pressure regulating capability.

SUMMARY OF THE INVENTION

This invention is an automatic tire inflation-pressure regulating system for wheeled vehicles with pneumatic tires. The system has a system control assembly in the vehicle operator's compartment, control signal transmitter assemblies on the vehicle body in positions such as the fenders in close proximity to each vehicle road wheel, and a tire pressure-regulating wheel assembly on each wheel. Controls in the control assembly for the remote deflation or inflation and for the monitoring of the pneumatic tires are connected to the transmitter assemblies which convert the electrical command signals to RF signals that are received by an electronic module in each wheel assembly. Each wheel assembly has deflation means and inflation means connected through appropriate valving to the tire, and a receiver circuit for activating selectively the deflation and inflation means in response to the RF signals. The means for providing a gas under pressure for inflating the tires on command comprise either a plurality of gas generators or a reservoir of pressurized gas-generating liquid.

DESCRIPTION OF THE DRAWINGS

For the purpose of illustrating the invention, there is shown in the drawings the forms which are presently preferred; however, it should be understood that the invention is not necessarily limited to the precise arrangements and instrumentalities here shown.

DESCRIPTION OF THE PREFERRED EMBODIMENTS

Figure 1:
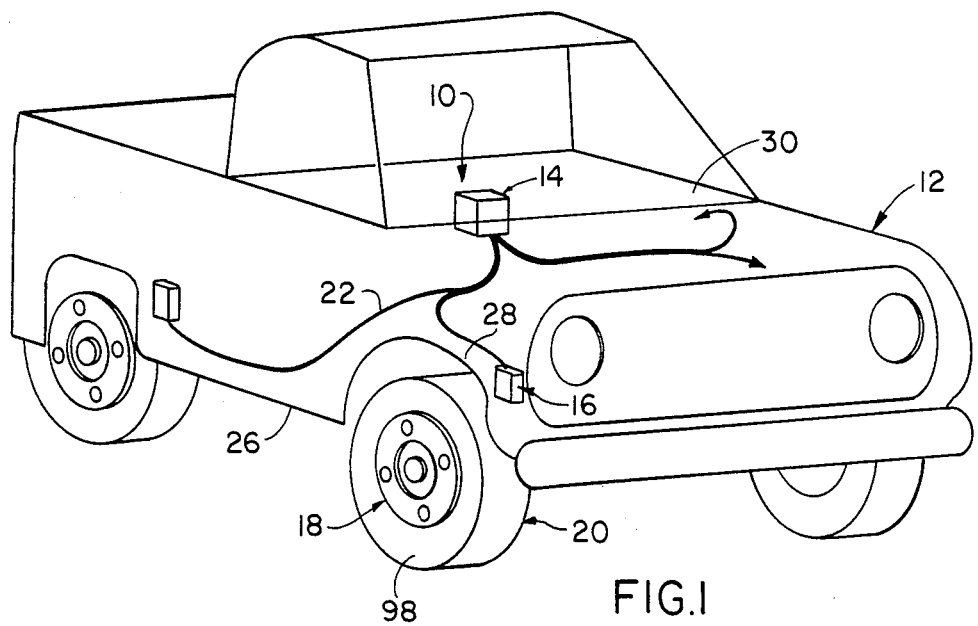
FIG. 1 is a schematic perspective drawing of a vehicle showing components of the tire inflation pressure regulating system of the invention.
Figure 2:
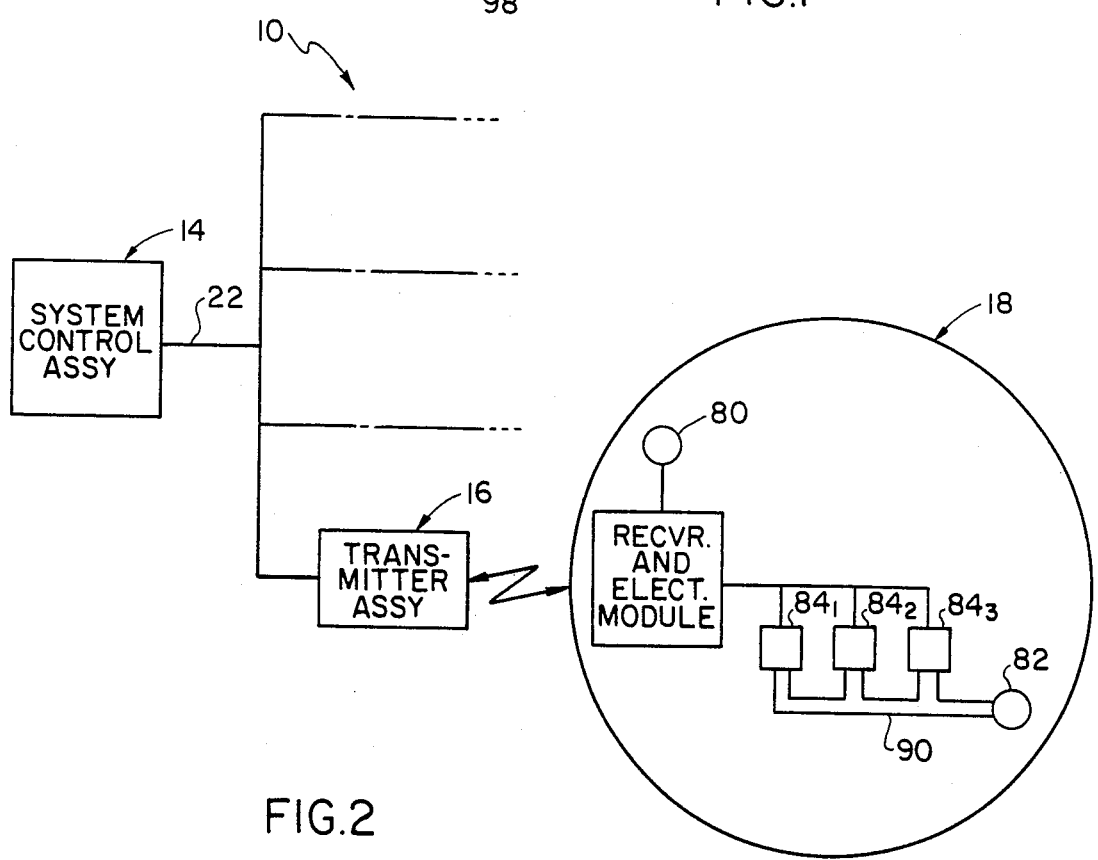
FIG. 2 is a diagrammatic representation of the operating components of the system of the invention.

With reference now to the drawings, FIG. 1 shows an embodiment of the pneumatic tire pressure-regulating system 10 of the invention fitted on a motor vehicle 12. System 10 comprises a system control assembly 14, a number of transmitter assemblies 16, a tire pressure-regulating wheel assembly 18 mounted on each one of the roadwheels 20 of vehicle 12. An electrical circuit 22 connects the control assembly 14 electrically with each transmitter assembly 16 and an RF link connects the transmitter assembly with an RF receiver 24 in each wheel assembly 18. Preferably each RF transmitter 16 is located on the vehicle body 26 such as on the fenders 28 thereof in a position close to its associated wheel assembly.

Figure 3:
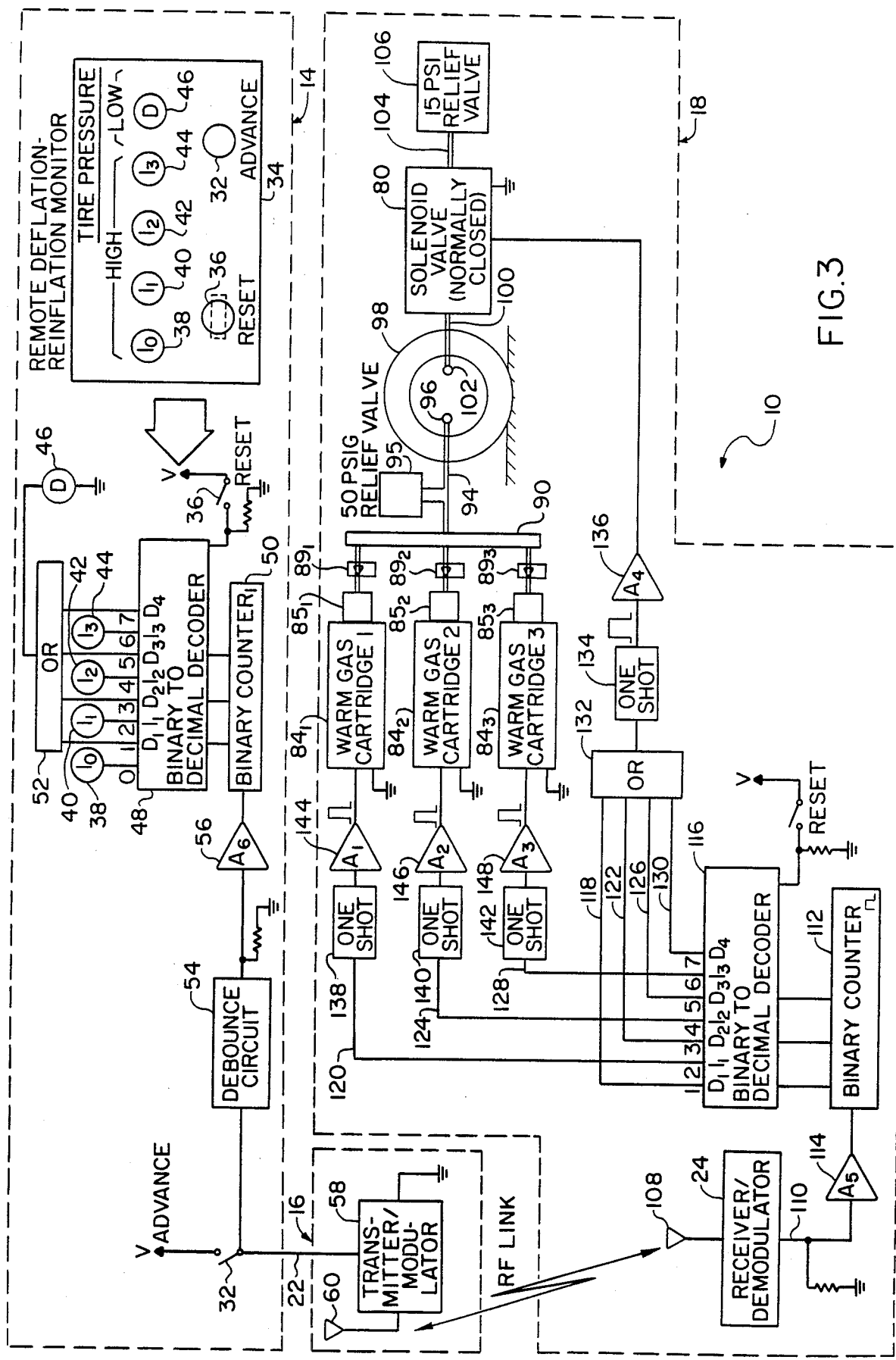
FIG. 3 is a schematic diagram of an embodiment of the system of the invention.

The system control assembly is positioned convenient to the vehicle operator in a location such as the driver's compartment 30 of the vehicle. As indicated in FIG. 3, a pushbutton momentary switch 32 marked "ADVANCE" is provided on the panel 34 of control assembly 14 to operate the system of the invention and a pushbutton "RESET" switch 36 is provided to put the logic circuits of the system into a RESET reference mode. A system of indicator lights 38, 40, 42, 44, and 46, marked $I_0$, $I_1$, $I_2$, $I_3$, and D respectively are provided to monitor the operation of the system. As further indicated in FIG. 3 the control assembly has a binary to decimal decoder 48, a binary counter 50, an "OR" circuit 52, and a debounce circuit 54. A gate 56 is employed to sharpen the rise time of the control pulses of the system. Control signals are passed by means of wiring circuit 22 to the transmitter assembly 16. Assembly 16 can consist of a suitable transmitter/modulator 58 coupled to an appropriate antenna 60 for the transmission of RF control signals.

Figure 4:
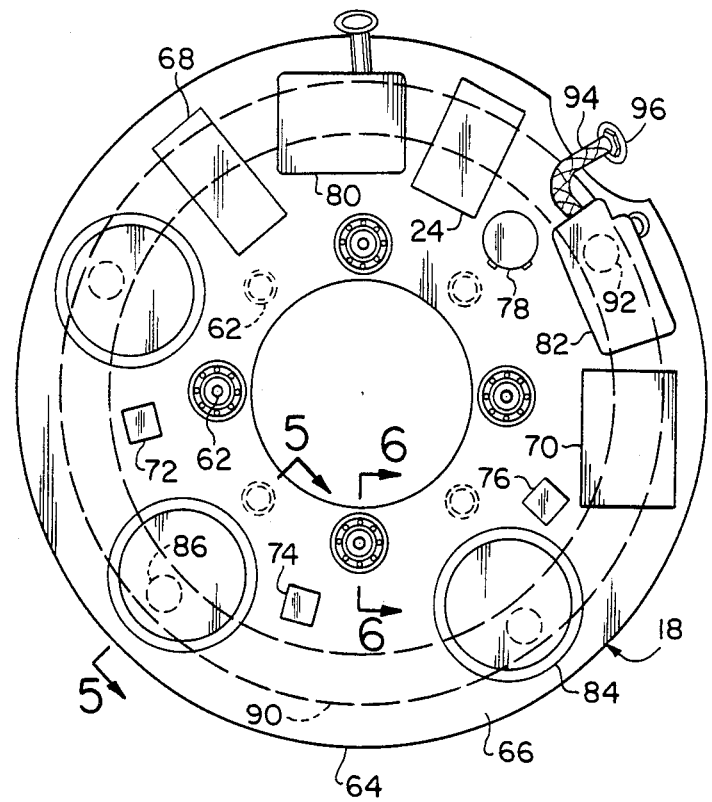
FIG. 4 is a side elevation with its cover removed of a tire pressure-regulating wheel assembly of the FIG. 3 embodiment of the invention.

Each of the tire pressure-regulating wheel assemblies 18 is a self-contained unit that bolts on the outside of the vehicle road wheel 20 using a number of the existing wheel studs 62. For the particular wheel indicated in FIG. 4, four of the eight wheel studs 62 are utilized to mount wheel assembly 18. The construction of the wheel assembly and the details of its mounting can be better understood if reference is also made to FIGS. 5 and 6. As shown, the wheel assembly has a flat circular base plate 64 having mounted on its outer face 66, the RF receiver/modulator 24, an electronics module 68, a source of electrical energy such as a battery 70, four buffer/power switches 72, 74, 76, and 78, a deflation valve assembly 80, an inflation valve assembly 82, and several gas generators 84. Three gas generators are shown, but it will be appreciated that a greater or lesser number can be provided as required. Each gas generator has a housing 83 which is integral with the base plate 64. Each housing is provided with a screw-on cover 87 which can be removed as required to replace exhausted gas cartridges (not shown).

Figure 5:
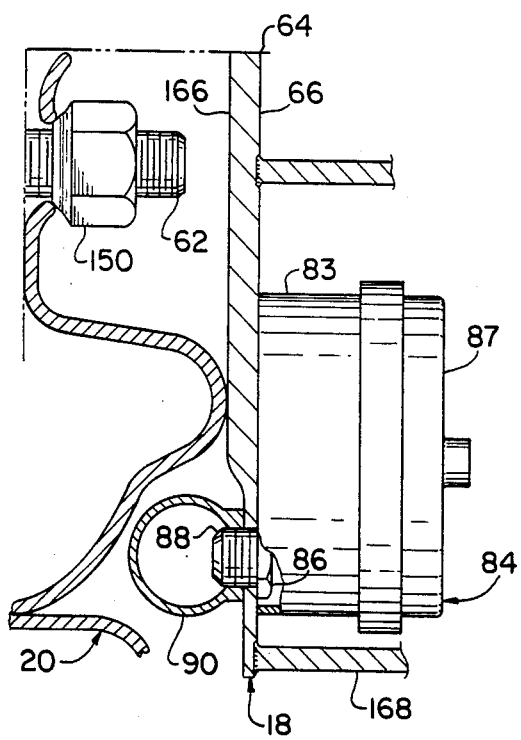
FIG. 5 is fragmentary view partially in section of a wheel assembly taken along line 5—5 of FIG. 4 showing the relationship of the gas generators and the plenum of the inflation means of the invention with respect to a vehicle wheel.

Gas generators of various types are commercially available and suitable generators of the warm-gas type produce a gas at 250° F. at moderate pressures. These generators use compact internal heat sinks to cool the generated gas, thereby resulting in a significant volumetric reduction in the size of the unit. The advantages of the use of gas generators rather than bottled gas will be seen in the fact that each gas generator unit is only about 17 cubic inches in size as contrasted with a size of about 98 cubic inches for an equivalent 3000 psi-stored air bottle-a volumetric savings of about 6:1. In addition to their advantage in compactness, warm gas cartridges at high volume rates can be manufactured at a relatively low cost. A further advantage of a relatively low temperature gas system is that is permits the use of common commercially available valving without a requirement for expensive high-temperature-resistant valve seats, seal materials, and the like. A common ammonium nitrate propellant is preferred for use since it produces gas at relatively low burn rates, making cartridges of compact size feasible. Each of the gas generators 84 is charged with a replaceable cartridge or unit containing an electrical igniter, a solid propellant charge, a chemical heatsink, a 6-micron nominal gas filter 85, and a check valve 89. As indicated in FIG. 5, each gas generator 84 has an outlet 86 connected to a fitting 88 which passes the gas output of the generator into a tubular plenum 90. The plenum, in turn, has an output opening 92 leading through inflation valve assembly 82 to a flexible conduit 94 in fluid communication with a rim port 96 opening into the pneumatic tire 98 mounted on the vehicle wheel 20. The inflation valve assembly is provided with a relief valve 95 which is set to open at a predetermined pressure, such as 50 psig.

Each wheel assembly has a normally closed deflation valve assembly 80 which is in fluid communication with the tire by means of a flexible conduit 100 connected to a second rim port 102. The deflation valve has an output line 104 which exhausts to ambient through a relief valve 106 set at an appropriate pressure level such as 15 psi.

The electronic circuitry for the remote control of the deflation and inflation operation includes the receiver/demodulator 24 which is provided with a suitable antenna 108. Output signals from the receiver/demodulator are passed through electrical line 110 to a binary counter 112 after having the rise times of the signals sharpened by gate 114. The output of the counter 112 is decoded in binary to decimal decoder 116. Decoder 116 outputs through seven lines 118, 120, 122, 124, 126, 128, and 130, with the output conductors 118, 122, 126, and 130 transmitting command signals to the deflation system and conductors 120, 124, and 128 to the inflation system. Deflation command signals pass through OR gate 132 to a one-shot pulse generator 134 which produces a pulse to trigger buffer/power switch 136 to actuate the solenoid of the deflation valve 80. Inflation command signals pass to one-shot pulse generators 138, 140, and 142 which produce pulses to trigger buffer/power switches 144, 146, and 148 for igniting their respective gas generators to produce a supply of pressurized gas to inflate the tire 98. In the embodiment illustrated in FIGS. 3 and 4, three gas generators 84 are shown. It will be appreciated that this number of gas generators will allow the tire to be inflated three times. The inflation capability of the system is restored, of course, merely by replacing the exhausted gas cartridges of the generators with fresh units. The battery 70 provides the electrical power required to operate the components of the wheel assembly. A compact, rechargeable unit is preferred for obvious reasons.

Figure 6:
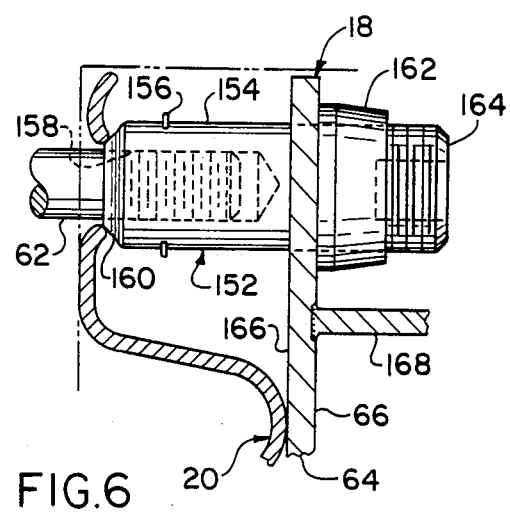
FIG. 6 is a fragmentary view partially in section of a wheel assembly mounting means threaded on a wheel mounting stud of a vehicle wheel.

As has been stated previously herein, for the particular example wheel shown, four of the existing eight wheel studs are used to mount the wheel assembly 18 on the outside of the vehicle wheel. To install the wheel assembly, alternate wheel nuts are removed such that the vehicle wheel is retained by four nuts 150 (see FIG. 5). Four special fasteners 152 are provided in the base plate 64 for mounting the wheel assembly 18. As shown in FIG. 6, each of the fasteners 152 has an elongated body 154 which is inserted in the base plate and retained therein during pre-mounting handling by a snap ring retainer 156. A threaded bore 158 fitting the wheel stud 62 is provided in the wheel or inside end 160 of the fasteners and the end itself is shaped identical to the wheel side of the standard wheel nut 150. A self-locking nut 162 is threaded on the outer end 164 of the fastener. To install the wheel assembly 18, the special fasteners 152 are aligned with the studs 62 from which the wheel nuts 150 have been removed and the fasteners are turned down with a internal wrench to bring the inside end 160 snugly against the wheel 20. The self-locking nuts 162 are then turned down with an external wrench to bring the inside surface 166 of the base plate snugly against the vehicle wheel 20. If the wheel assembly 18 is provided with a protective cover 168, it can be installed at this time.

When the system is installed, the logic circuits in the system control assembly 14 and in the wheel assembly 18 are both put into a RESET reference mode. The logic then remains quiescently ON at all times when the vehicle is being operated. Battery drain will be negligible if C/MOS-implemented logic is employed. This continuously ON condition is required to have the wheel assembly electronics constantly "listening" for commands. It also permits clocked strobing of the receiver power in synchronization with the control assembly command generation electronics. Power strobing is a known technique that can be employed to minimize the size and cost of the wheel assembly battery. In operation, initially, with the vehicle tires in a fully pressurized condition, indicator $I_0$ is on. To deflate the tires, the momentary pushbutton ADVANCE switch 32 is depressed. This results in both binary counters 50 and 112 concurrently advancing from their RESET 0 count to a value 1. It will be appreciated that the command pulse inputs directly to binary counter 50 and is transmitted to binary counter 112 by means of the RF link. Both counters are decoded by their respective binary to decimal decoders. On the control assembly panel 34 in the vehicle driver's compartment, the decoded value 1 causes the deflate indicator D light 46 to turn on. In the wheel assembly, the decoded value 1 is inputted to OR gate 132 which passes the pulse to the one-shot pulse generator 134 which produces a 60-second pulse. This pulse is coupled through buffer/power switch 136 to open the normally closed solenoid of the deflation valve 80 for the same 60 seconds. Pressurized air is thus permitted to flow out of the tire and through the 15 psig relief valve 106. Deflation is thus limited to permit the retention of 15 psig in the tire no matter how long the deflation valve remains open. At the expiration of 60 seconds, the deflation valve is closed.

Until subsequent commands are initiated, the indicator D remains on, indicating a deflated tire pressure condition. To advance from the deflate D mode back to a fully inflated condition, the pushbutton of the ADVANCE switch 32 is depressed. This action advances the counters 50 and 112 to a value 2. This is decoded in the control assembly and the D indicator goes off and the $I_1$, indicator goes on. Concurrently, the decoded 2 value is formatted into a pulse by the one-shot pulse generator 138 that is amplified by buffer/power switch 144 to a power level suitable for activating the igniter in the cartridge of gas generator 84. The ignited cartridge delivers a minimum of 0.25 lb. of gas for 18 seconds at a temperature of 250° F. into the tire. The gas flows through the integral cartridge exit 6-micron nominal filter to preclude downstream component contamination. After passing through the check valve 89, the gas flows through the plenum and exhausts into the tire cavity, inflating the tire from 15 psig to 50 psig in 18 seconds. Relief valve 95 limits maximum pressure to 50 psig cracking pressure. As the gas cools to ambient within the tire, the final pressure will be reduced to 35 psig. To initiate a further deflation cycle, the pusbutton of the ADVANCE switch is again depressed. Depressing the ADVANCE pushbutton thereafter will initiate a second inflation cycle. It will be appreciated, of course, that after three inflation cycles, the gas generators require recharging with fresh cartridges.

In the embodiment of our invention just described using cartridge-type gas generators, the system possesses an inherent safeguard: should a systems failure cause a simultaneous ignition of all three gas generators, the gas pressure produced thereby is significantly less than the tire burst pressure. If the burst pressure of a tire is assumed to be 325 psig minimum, in a situation where the relief valve fails and all three gas generators ignite simultaneously, the 250° F. gas would inflate the tires to 140 psig, or 43% of burst pressure.

Although it is assumed in the foregoing exposition of the system of our invention, that the tire whose pressure is being regulated is a tubeless tire, the system can be used equally advantageously with tires equipped with inner tubes. Also, although a chemical gas generating system is described, other types of pressurization systems for producing a fluid under pressure for inflating the tire are contemplated as being within the scope of our invention. These systems include a mechanical pump powered, for example, by a wheel-mounted power source such as a battery. However, a system using a liquid stored under pressure as a source of pressurized gas has many advantages.

Figure 7:
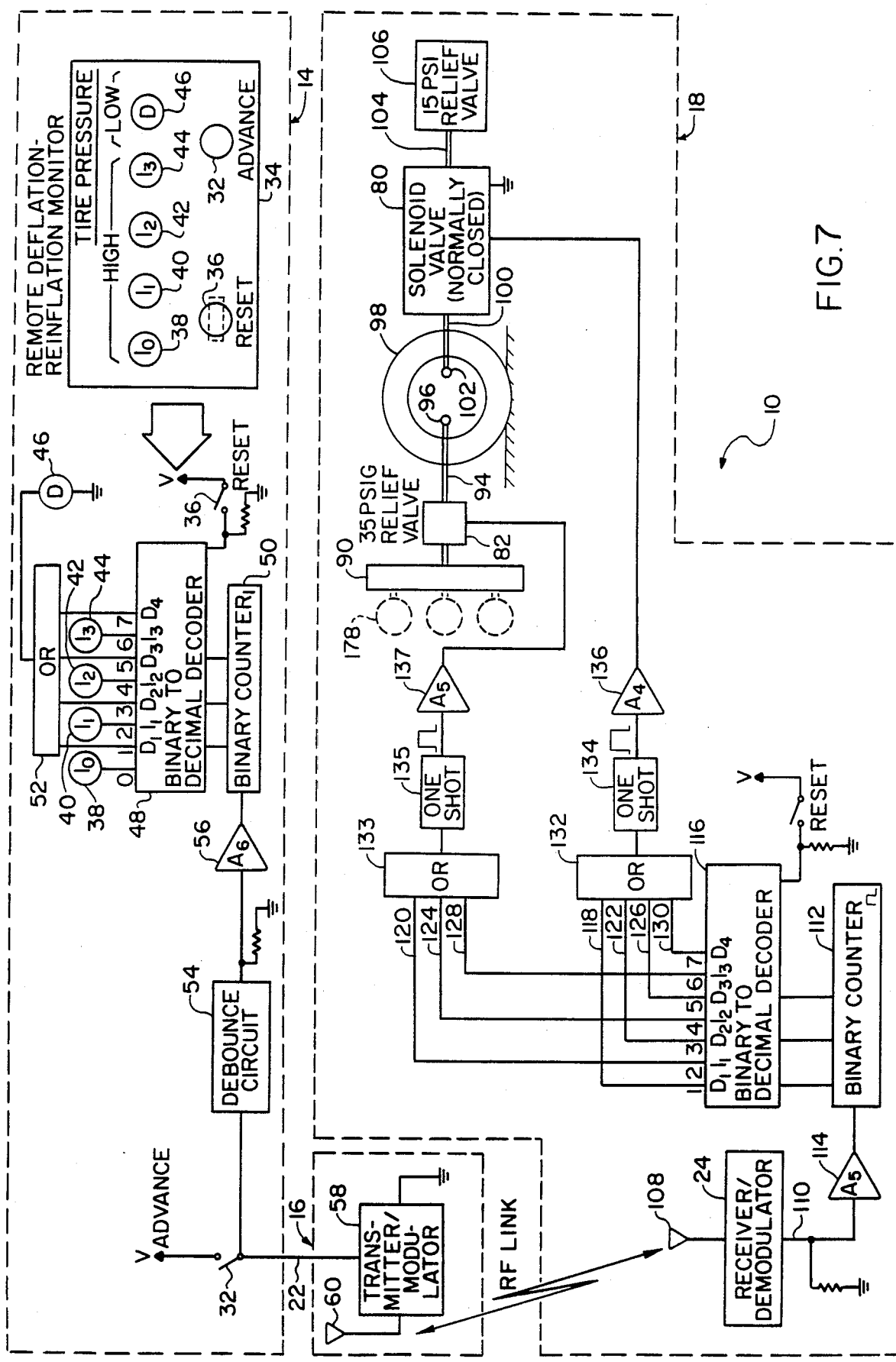
FIG. 7 is a schematic diagram of a preferred embodiment of the system of the invention.
Figure 8:
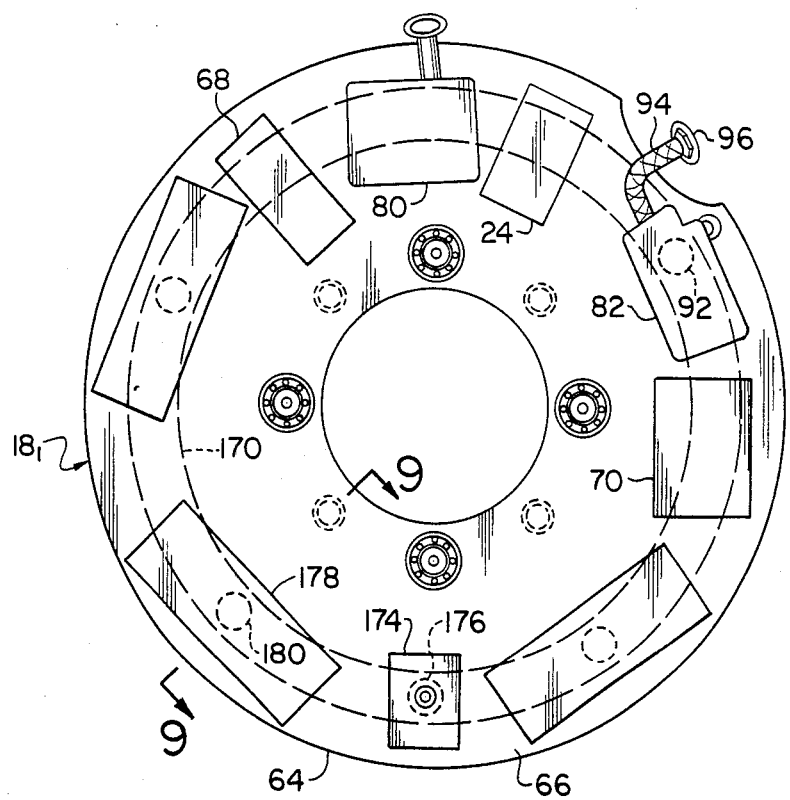
FIG. 8 is a side elevation with its cover removed of the FIG. 7 embodiment of a tire pressure-regulating wheel assembly of the invention.
Figure 9:
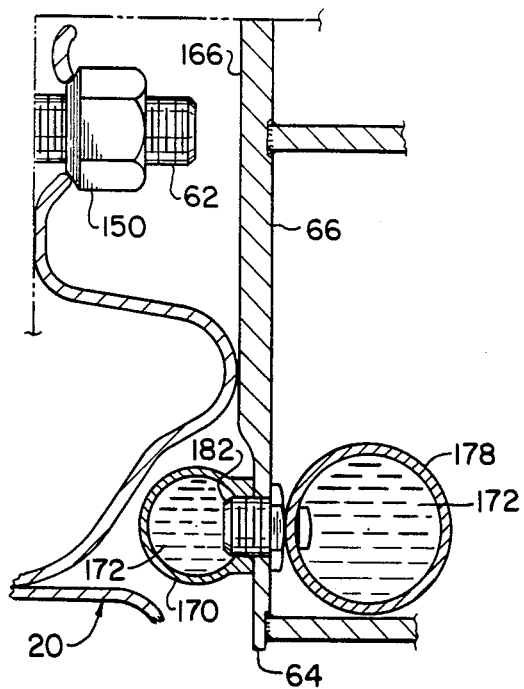
FIG. 9 is a fragmentary view partially in section of the wheel assembly of FIG. 8 taken along line 9—9 showing the relationship of the elements of the inflation means of the invention with respect to a vehicle wheel.

FIGS. 7, 8, and 9 illustrate a preferred embodiment of the invention which uses a system in which a liquid stored under pressure is the source of pressurized gas used for maintaining the required inflation pressure level in the pneumatic tires of a vehicle. In this embodiment, the pressure regulating system of the invention comprises a system control assembly, a number of RF transmitter assemblies fitted on the body of the vehicle, and a tire pressure-regulating wheel assembly mounted on each of the road wheels of the vehicle. The system of this embodiment is identical to system 10 of FIGS. 1–6 except for differences that are obvious or that will be identified in the following description. Thus, an electric circuit connects the control assembly electrically with each transmitter assembly and an RF link connects the transmitter assembly with an RF receiver in each wheel assembly. As is the case in the previously described embodiment, each RF transmitter preferably is located on the vehicle in a position such as on the fenders in close proximity to the associated wheel assemblies.

With reference now to FIGS. 7–9, each of the tire pressure-regulating wheel assemblies $18_1$, is a self-contained unit that bolts on the outside of the vehicle road wheel 20 using a number of the vehicle wheel studs 62 as has been described for the FIGS. 1–6 embodiment. Each wheel assembly $18_1$ has a flat circular base plate 64 having mounted on its outer face 66, an RF receiver/modulator 24, an electronics module 68, a source of electrical energy such as a battery 70, a deflation valve assembly 80, an inflation valve assembly 82, and a container 170 containing a gas-generating liquid 172 under pressure. Preferably the gas-generating liquid is one of the widely used Freon refrigerants such as Freon 22, (Monochlorodifluoromethane) which is contained at a nominal 300 psi storage pressure. Container 170 is a tubular toroidal pressure vessel suitably mounted on the inside surface 166 of the base plate 64. A suitable known fill valve means 174 is provided for recharging the container with liquid. As is common practice, a suitable thermal fuse 176 can be fitted in valve means 174 for safely venting the liquid 172 from the container in event of fire or other thermal overload. The container has an outlet opening 92 leading through inflation valve assembly 82 to a flexible conduit 94 in fluid communication with a rim port 96 opening into the pneumatic tire 98 mounted on the vehicle wheel. As in the previously described embodiment, the inflation valve assembly is provided with an integral check valve and a relief valve which is set to open at a predetermined pressure, such as 35 psi. An additional reserve capacity of gas-generating liquid 172 can be furnished to supplement the supply carried in container 170. The supplemental supply can be carried in one or more containers such as pressure vessels or flasks 178 suitably mounted in an appropriate location such as on the surface 66 of the base plate 64. As indicated in FIG. 8, each flask 178 has an outlet 180 connected to a fitting 182 opening into annular fluid container 170. Fitting 182 provides an unimpeded passage for the liquid 172 such that the flask 178 can be filled when container 170 is replenished through fill valve 174.

In the operation of this embodiment having the wheel assemblies $18_1$ of FIGS. 7–9, with the vehicle tires in a fully pressurized condition, indicator $I_0$ initially is on. To deflate the tires, the momentary pushbutton ADVANCE switch 32 is depressed. This action results in both binary counters 50 and 112 concurrently advancing from their reset 0 count to a value 1. As has been explained, the command pulse inputs directly to binary counter 50 and is transmitted to binary counter 112 by means of the RF link. Both counters are decoded by their respective binary to decimal decoders. The decoded value 1 causes the deflate indicator D light 46 on control panel assembly 34 to turn on. In the wheel assembly, the decoded value 1 is inputted to OR gate 132 which passes the pulse to the one-shot pulse generator 134 which produces a 60-second pulse. This pulse is coupled thrugh buffer/power switch 136 to open the normally closed solenoid of the deflation valve 80 for the same 60 seconds. Pressurized air is thus permitted to flow out of the tire and through the 15 psig relief valve 106. Deflation is thus limited to permit the retention of 15 psig in the tire no matter how long the deflation valve remains open. It will be appreciated, of course, that if the retention of some other level of air pressure in the tire be desired, the relief valve setting can be selected accordingly.

Until subsequent commands are initiated, the indicator D remains on, indicating a deflated tire pressure condition. To go from the deflate D mode back to a fully inflated condition, the pushbutton 32 of the ADVANCE switch is depressed. This action advances the counters 50 and 112 to a value 2. This is decoded in the control assembly and the D indicator goes off and the $I_1$ indicator goes on. Concurrently, the decoded 2 value is inputted to OR gate 133 which passes the pulse to the one-shot pulse generator 135 which produces a timed pulse, say 30 seconds. This pulse is coupled through buffer/power switch 137 to open the normally closed inflation valve 82 for the same timed interval. At the end of this interval, the inflaton valve 82 is closed. During the valve open interval, the stored liquid 172 flows through flexible conduit 94 and rim port 96 into pneumatic tire 98. The valve open time interval is chosen to be slightly longer than required for the inflating tire to reach the desired pressure, such as 35 psi, thus assuring that a sufficient charge of pressurizing fluid has entered the tire when the relief valve opens. As the fluid 172 flows into the tire it expands to a gas and cools. After the inflation valve 82 closes, the initially cool gas in the tire will warm up, but the relief valve will maintain the desired pressure. To initiate a further deflation cycle, the pushbutton of the ADVANCE switch is again depressed. The number of inflation cycles is determined by the total quantity of liquid 172 which can be carried in plenum 170 plus flask(s) 178.

Although shown and described in what are believed to be the most practical and preferred embodiments, it is apparent that departures from the specific methods and designs described and shown will suggest themselves to those skilled in the art and may be made without departing from the spirit and scope of the invention. We, therefore, do not wish to restrict ourselves to the particular constructions described and illustrated, but desire to avail ourselves of all modifications that may fall within the scope of the appended claims.

Having thus described our invention, what we claim is:

1. An automatic tire inflation-pressure regulating system for wheeled vehicles with pneumatic tires comprising:
    means fitted on each of the road wheels of said vehicle for regulating the inflation pressure of said pneumatic tires mounted on said wheels, said pressure regulating means including deflation means and inflation means in fluid communication with the interior of said tires, and RF signal receiving means associated with means for actuating selectively either said deflation means or said inflation means;
    RF signal transmitting means on said vehicle at a location proximate each of said wheels for providing command signals to said signal receiving means for activating said tire inflation-pressure regulating means on said wheels;
    control means in said vehicle operable manually by an occupant thereof and connected to said RF signal transmitting means for providing command inputs for selectively deflating or inflating said tires.

2. The inflation-pressure regulatng system of claim 1 wherein said regulating means on each of said wheels includes an energy source for supplying power for the operation of said RF signal receiving means and said deflation and inflation means.

3. The inflation-pressure regulating system of claim 1 wherein said inflation means include gas generating means for providing a supply of gas under pressure.

4. The inflation-pressure regulating system of claim 3 wherein said gas generating means are charged with a combustible chemical propellant and wherein electrical means are provided for igniting said propellant on demand.

5. The inflation-pressure regulating system of claim 4 wherein said chemical propellant is ammonium nitrate.

6. The inflation-pressure regulating system of claim 3 wherein said gas generating means is a volatile liquid contained in a reservoir under pressure and wherein valve means are provided to meter said liquid from said reservoir whereby said liquid undergoes a change of state such that its gaseous phase can be used to inflate said tire.

7. The inflation-pressure regulating system of claim 6 wherein said liquid is a Freon refrigerant.

8. The inflation-pressure regulating system of claim 7 wherein said liquid is Freon 22 (monochlorodifluoromethane).

9. The inflation-pressure regulating system of claim 1 wherein an inner tube is carried in the tire whose pressure is being regulated and wherein the inflation and deflation means are in fluid communication with said inner tube.

* * * * *